United States Patent [19]

Richmond

[11] Patent Number: 4,715,267
[45] Date of Patent: Dec. 29, 1987

[54] BEARING SURFACE FOR INTERNAL COMBUSTION ENGINE PISTON SKIRT

[75] Inventor: John W. Richmond, Rugby, England
[73] Assignee: AE PLC, Warwickshire, England
[21] Appl. No.: 809,712
[22] Filed: Dec. 17, 1985
[30] Foreign Application Priority Data Dec. 19, 1984 [GB] United Kingdom ............... 8432015

[51] Int. Cl.⁴ ............... F16J 1/02; F16J 1/04; F16J 1/16
[52] U.S. Cl. ............... 92/232; 92/237; 92/238; 92/239
[58] Field of Search ............... 92/232–235, 92/237–239; 384/38

[56] References Cited

U.S. PATENT DOCUMENTS

| | | | |
|---|---|---|---|
| 1,725,676 | 8/1929 | Saunders | 92/232 X |
| 1,774,396 | 8/1930 | Noble | 92/237 |
| 1,891,914 | 12/1932 | Butler | 92/239 X |
| 1,926,329 | 9/1933 | Chilton | 92/237 X |
| 2,352,592 | 7/1944 | Alexandrescu | 92/239 X |
| 2,705,667 | 4/1955 | Fahlman et al. | 92/232 X |
| 3,987,709 | 4/1975 | Day | 92/232 |
| 4,161,165 | 7/1979 | Belush et al. | 92/237 X |
| 4,354,426 | 10/1982 | Steidle | 92/238 X |

FOREIGN PATENT DOCUMENTS

| | | |
|---|---|---|
| 0003439 | 8/1979 | European Pat. Off. . |
| 935221 | 11/1955 | Fed. Rep. of Germany ........ 92/239 |
| 943021 | 5/1956 | Fed. Rep. of Germany ........ 92/239 |
| 929082 | 1/1946 | France ................... 92/239 |
| 1169867 | 1/1959 | France . |
| 1384266 | 11/1964 | France . |

*Primary Examiner*—Robert E. Garrett
*Assistant Examiner*—George Kapsalas
*Attorney, Agent, or Firm*—Leydig, Voit & Mayer

[57] ABSTRACT

A piston for an internal combustion engine is provided with two separate skirt portions on either side of the gudgeon pin bore. Each skirt portion is the shape of a sector of a cylinder and is cantilevered on a pair of struts connected to the skirt members at points intermediate their top and bottom edges. The skirt members have top and bottom bearing surfaces which provide the running surfaces against the associated cylinder or liner and which are connected to the centers of the skirt members by flexible flanges. This allows these running portions to flex and absorb substantial lateral loads without creating noise so that the piston is quiet as well as being lightweight.

7 Claims, 6 Drawing Figures

BEARING SURFACE FOR INTERNAL COMBUSTION ENGINE PISTON SKIRT

BACKGROUND TO THE INVENTION

1. Field of the Invention

The invention relates to pistons and in particular to pistons for internal combustion engines or compressors.

2. Review of the Prior Art

A typical piston of a known design has a crown, a ring band, two gudgeon pin bosses defining a gudgeon pin bore and a skirt depending from the ring band and extending around the piston. The function of the skirt is to guide the piston in its reciprocating movement in an associated cylinder or liner. As well as performing this reciprocating movement, the piston also moves laterally within the associated cylinder or liner as a result of the clearance needed between the piston and the associated cylinder or liner and as a result of the varying direction of the forces applied to the piston by an associated connecting rod.

These movements can result in so-called "piston slap" which radiates sound energy that is noticeable and intrusive above the general engine noise. This noise can occur on starting, during acceleration of the engine or at high speeds or loads, or during two or more of these conditions. The slap can occur at any part of the piston cycle, although most radiated noise is usually produced just after top dead centre firing when the rapid increase in combustion cylinder pressure causes large lateral accelerations of the piston and thus high impact velocities between the piston and the associated cylinder or liner.

There have been many proposals for reducing the noise generated in this way. Amongst these have been proposals, in pistons for internal combustion engines, directed to the reduction of heat flow from the crown to the skirt to allow the piston, when cold, to be a closer fit in the associated cylinder or liner and so decrease the scope for lateral movement of the piston. A similar effect in such pistons has been sought by the use of expansion control inserts which limit the expansion of the piston on heating, so again allowing a tighter initial fit.

SUMMARY OF THE INVENTION

According to the invention, there is provided a piston for an internal combustion engine or a compressor comprising a crown, a ring band, two gudgeon pin bosses defining a gudgeon pin bore, and two arcuate skirt members on opposite sides of the gudgeon pin bore and spaced from the ring band, each skirt member being carried on at least one strut extending from an associated gudgeon pin boss, and each skirt member including a circumferentially extending bearing surface for transmitting lateral loads and guiding the piston during reciprocation, and including a flexible flange connected between the bearing surface and the associated at least one strut to space the bearing surface from the associated at least one strut in an axial direction, the flexible flange allowing flexure of the associated bearing surface under high lateral loads to reduce piston noise.

Thus the invention provides a skirt where a guidance part of the skirt is mounted in flexible fashion. Where high lateral loads are encountered of the kind tending to produce piston slap in conventional pistons, the skirt portion of the invention flexes to reduce such noise.

BRIEF DESCRIPTION OF THE DRAWINGS

The following is a more detailed description of an embodiment of the invention, by way of example, reference being made to the accompanying drawings in which.

DESCRIPTION OF THE PREFERRED EMBODIMENTS

Figure 1:
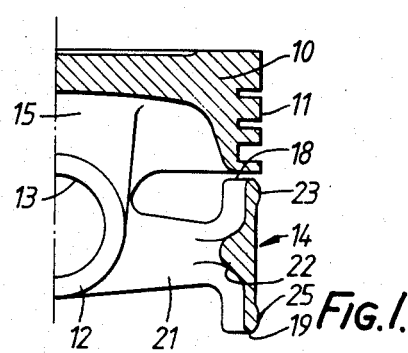
FIG. 1 is a partial cross-section of a piston for an internal combustion engine in a plane normal to the gudgeon pin bore axis and including the piston axis.

Referring to the drawings, the piston is of aluminum or an aluminum alloy and is formed by a casting process, which may be a squeeze casting process in which molten metal fed, by gravity, into a die, is solidified under a force of many tonnes. The piston may be reinforced in any known way.

The piston comprises a crown 10, a ring band 11, two gudgeon pin bosses 12 defining a gudgeon pin bore 13 and two arcuate skirt members 14 on opposite sides of the gudgeon pin bore. The crown is carried on webs 15 (FIG. 1) extending upwardly from the gudgeon pin bosses 12. The ring band 11 is of conventional type including two upper compression ring grooves and a lower oil scraper ring groove.

Figure 3:
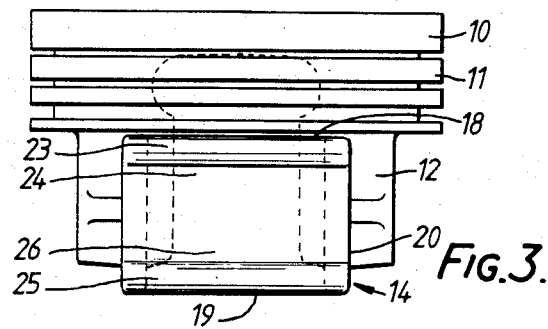
FIG. 3 is an elevation of the piston of FIGS. 1 and 2.
Figure 4:
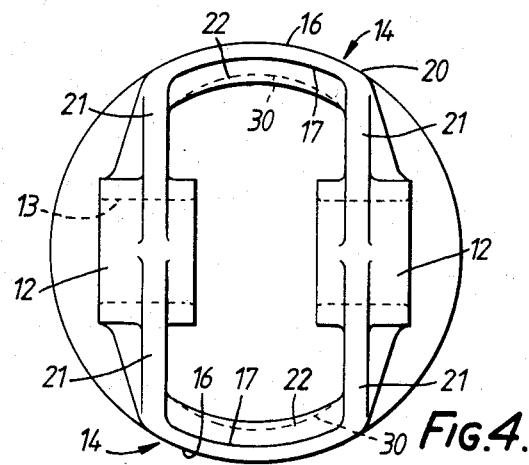
FIG. 4 is an underneath plan view of the piston of FIGS. 1 to 3.

Each skirt member 14 is, as best seen in FIGS. 3 and 4, the general shape of a sector of a cylinder, with arcuate outer and inner surfaces 16, 17, upper and lower edges 18, 19 lying in planes normal to the piston axis, and side edges 20 lying in planes including the piston axis. The gap between the upper edge 18 of each skirt member 14 and the lower edge of the ring band 11 is small; for example as little 1 mm. The arcuate extent of each skirt member 14 may be between 60° and 80°.

Each skirt member 14 is carried by a pair of parallel struts 21. As best seen in FIG. 4, each strut 21 extends from an associated gudgeon pin boss 12 in a direction normal to a plane including the piston axis and the gudgeon pin bore axis. Each strut 21 lies in a plane normal to the gudgeon pin bore axis 13 and is connected adjacent a respective side edge 20 of the associated skirt member 14. Each strut 21 is connected to the associated skirt member 14 at a point mid-way between its upper and lower edges. A central rib 22 of increased radial thickness extends circumferentially around the radially inner surface 17 of each skirt member 14 between the points of connection of the struts 21 with the associated skirt member 14.

The radial thickness of the central rib may decrease towards its centre, as shown in broken line at 30 in FIG. 4.

Figure 2:
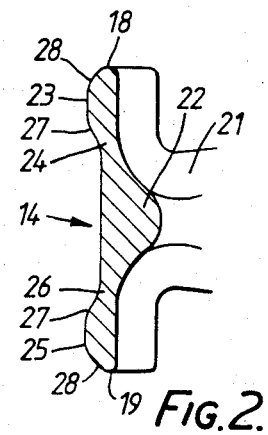
FIG. 2 is a section through a skirt member of the piston of FIG. 1, to a scale larger than the scale of FIG. 1.

Each skirt member 14 is constructed as follows, with particular reference to FIG. 2.

An arcuate circumferentially extending bearing surface 23 of the skirt member 14 is spaced upwardly (i.e. towards the crown) from the points of connection of the skirt member 14 and the associated struts 21 by a flexible flange 24 leading from the radially thickened rib 22. The arrangement is similar beneath the rib 22: a lower arcuate circumferentially extending bearing surface 25 is spaced downwardly (i.e. away from the crown) from the points of connection of the skirt member 14 and the associated strut 21 and is spaced by a flexible flange 26 (although, in the case of the lower bearing surface 25, this may be omitted). The upper and lower flanges 24, 26 may have differing flexibilities, for example, the upper flange 24 may be less flexible than the lower flange 26, since the lower flange 26 is less highly loaded than the upper flange 24 and so can be more flexible without suffering from fatigue.

The upper and lower bearing surfaces 23, 25 are spaced radially outwardly of the remainder of the outer surface 16 of each skirt member 14 by a distance which may be 125 microns or less. Between these bearing surfaces 23, 25 and the radially outer surfaces of the flanges 24, 26, there is a ramp 27 whose angle may be less than 2°. Similar ramps 28 may be provided between the bearing surfaces 23, 25 and the upper and lower edges 18, 19 of the skirt member 14, respectively.

In use, the piston is connected to a connecting rod by a gudgeon pin (not shown) and is mounted in a cylinder of an internal combustion engine or compressor. Because of their arrangement between the struts 21, the skirt members 14 are inwardly flexible and thus the piston can be a very tight fit within the associated cylinder or liner.

In use, the piston reciprocates in the cylinder and is guided by the upper and lower bearing surfaces 23, 25 of the skirt members 14. As well as reciprocating, the piston also moves laterally within the associated cylinder or liner, as a result of the slight clearance needed between the piston and the associated cylinder or liner and as a result of the varying direction of the forces applied to the piston by the associated connecting rod. The lateral forces are transmitted to the associated cylinder or liner by the bearing surfaces 23, 25.

Although these lateral movements are normally resisted by an oil film which is usually present between the skirt members and the associated cylinder or liner, there can be cases where lateral forces are so great and/or the oil film has dispersed, where the piston is forced against the associated cylinder or liner with a substantial force. On this occurrence, the bearing surfaces 23, 25 flex inwardly, due to the flexibility of the associated flanges 24, 26 and so absorb these forces without creating substantial noise. For example, the surfaces 23, 25 may flex inwardly by about 0.1 mm. Thus, the piston is quiet.

In addition, the skirt and crown are separated, thereby reducing thermal effects in the skirt and allowing small top of skirt clearances an optimum skirt profile. The ramps 27, 28 leading up to and away from the arcuate skirt portions ensure adequate lubrication of these portions in a manner described in our British Patent Specification No. 2104188. This provides hydrodynamic lubrication of the surfaces of the bearing surfaces 23, 25 but does so with great efficiency so that the friction induced by such hydrodynamic lubrication is minimised.

Further, because there is only a partial skirt, the piston is light in weight and this further improves the overall performance of an engine including the piston.

Figure 5:
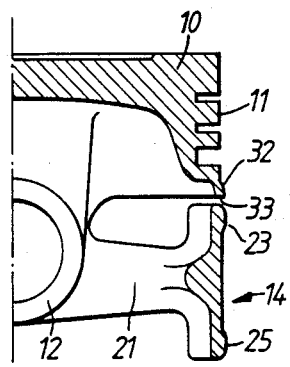
FIG. 5 is a similar view to FIG. 1, but showing a modified form of the piston of FIGS. 1 to 4 in which a land is provided extending downwardly from a ring band of the piston.

It will be appreciated that there are many alternative constructions embodying the above principles. One modified piston is shown in FIG. 5, in which parts common to FIGS. 1 to 4 and to FIG. 5 are given the same reference numerals and are not described in detail. In this piston, two diametrically opposed lands 32 depend from a lower edge of the ring band 11. Each land 32 is aligned with and is of the same angular extent as an associated skirt member 14. Each land 32 is provided with a lower edge 33 which lies in a plane normal to the piston axis and is spacewd by a gap from the upper edge 18 of the associated skirt member 14. This gap may have the same dimensions as the corresponding gap in the piston of FIGS. 1 to 4.

The provision of the lands 32 provides additional guidance for the piston when reciprocating in an associated cylinder or liner. This guidance may be required because at high piston speeds and temperatures, there may be a tendency for the deflection of the bearing surfaces 23 to be such that fatigue problems arise. The additional guidance of the lands 32 reduces or removes such problems by reducing the load on the bearing surfaces 23 under such conditions.

Further, two skirt members 14 may be provided on each side of the gudgeon pin bore 13, each connected to the bosses 12 by associated struts 21. In this case, the adjacent skirt members are arranged one above the other, separated by an axially and circumferentially extending gap through which oil can pass.

Where two such skirt members 14 are provided on each side of the bore 13, their ends may be interconnected to form a generally rectangular skirt structure.

Figure 6:
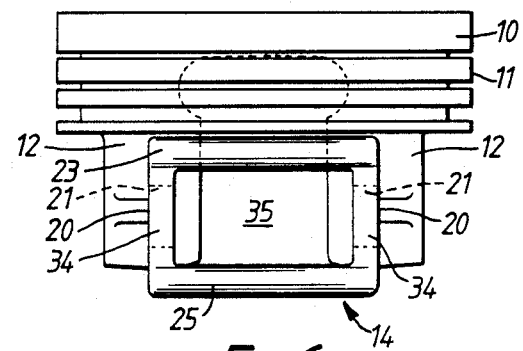
FIG. 6 is a similar view to FIG. 3, but showing a modified form of the piston of FIGS. 1 to 4 in which upper and lower bearing surfaces of a skirt of the piston, are separated by an axially and circumferentially extending gap.

A further modification is shown in FIG. 6, in which parts common to FIGS. 1 to 4 and to FIG. 6 are given the same reference numerals and are not described in detail. In this modification, the flexible flanges are not continuous around the associated skirt member 14. Rather, each bearing surface 23, 25 is connected to the associated strut 21 by flange segments 34 arranged at opposite ends of the associated bearing surface 23, 25, to space the bearing surfaces 23, 25 from the struts 21. Thus, the two bearing surfaces 23, 25 of each skirt member 14 are, between the associated struts 21, spaced by a circumferentially and axially extending window 35, so that they are unsupported between the associated struts 21.

It will also be appreciated that the struts 21 of each pair need not be parallel to one another. For example, the struts 21 of each pair may splay outwardly from their associated bosses 12 so that, in plan, there is an angle between them which is, say, 90°. This allows the provision of skirt members 14 of greater circumferential length than the skirt members 14 of the embodiments described above with reference to the drawings. Alternatively, the struts 21 of each pair may converge as they extend away from their associated bosses so that, once again, there is an angle between them which may be 90°. In this case, the skirt members 14 will be of lesser circumferential length than the skirt members 14 of the embodiments described above with reference to the drawings. Further, each strut 21 may be replaced by a pair of spaced upper and lower struts, so that there are four struts for each skirt member 14.

I claim:

1. A piston for an internal combustion engine or a compressor comprising:
   a crown,
   a ring band,
   two gudgeon pin bosses defining a gudgeon pin bore,
   two arcuate skirt members on opposite sides of the gudgeon pin bore and spaced from the ring band,
   two pairs of struts, each pair extending from respective gudgeon pin bosses and supporting an associated skirt member,
   a central portion of increased radial thickness included in each skirt member and extending circumferentially around each skirt member between points of connection of the associated struts with the skirt member,
   a circumferentially extending bearing surface included in each skirt member for transmitting lateral loads and guiding the piston during reciprocation, the bearing surface being axially spaced from said central portion of incresed radial thickness, a flexible flange included in each skirt member and connected between the associated bearing surface and the central portion of increased radial thickness the flexible flange being continuous around the circumferential extent of the associated bearing surface so that the flexible flange allows flexure of the associated bearing surface relative to the associated central portion under lateral loads, to reduce piston noise.

2. A piston according to claim 1, wherein each skirt member includes a second circumferentially extending bearing surface spaced axially from the associated central portion of increased radial thickness by a continuous flexible flange in a direction opposite to the spacing of said first-mentioned bearing surface, for transmitting lateral loads and guiding the piston during reciprocation thereof.

3. A piston according to claim 2, wherein the arcuate extent of each bearing surface is from 60° to 80°.

4. A piston according to claim 2, wherein the flexibility of the uppermost flexible flange is different from the flexibility of the lower flexible flange.

5. A piston according to claim 2, wherein each bearing surface of each skirt member is spaced radially outwardly of a radially outer surface of the associated flange, with said surfaces being connected by a ramp.

6. A piston according to claim 5, wherein the spacing is less than 125 microns and the ramp angle less than 2°.

7. A piston according to claim 1, wherein each strut lies in a respective plane normal to the gudgeon pin bore axis and extending in a direction normal to a plane including the piston axis and the gudgeon pin bore axis.

* * * * *